No. 658,933. Patented Oct. 2, 1900.
J. J. WALSH.
TRAP ATTACHMENT FOR NESTS.
(Application filed Jan. 31, 1900.)
(No Model.)
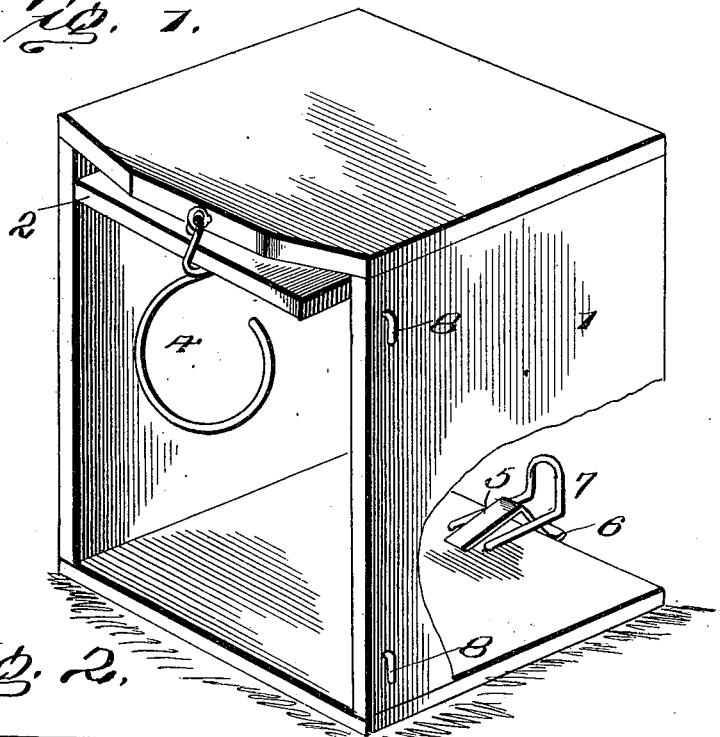
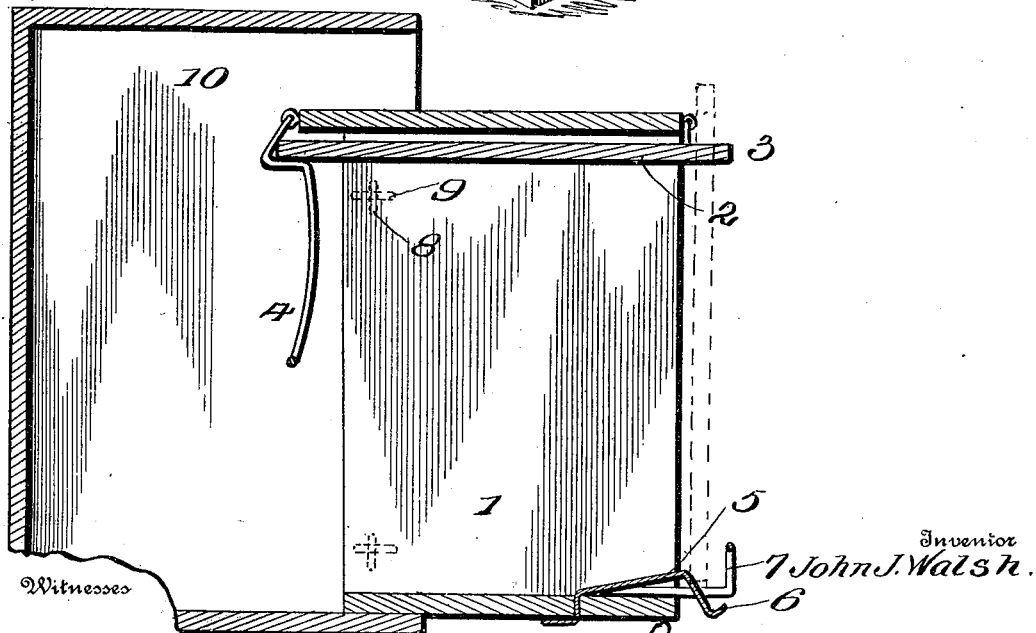
Inventor
John J. Walsh.

UNITED STATES PATENT OFFICE.

JOHN J. WALSH, OF MANASSAS, VIRGINIA.

TRAP ATTACHMENT FOR NESTS.

SPECIFICATION forming part of Letters Patent No. 658,933, dated October 2, 1900.

Application filed January 31, 1900. Serial No. 3,515. (No model.)

*To all whom it may concern:*

Be it known that I, JOHN J. WALSH, a citizen of the United States, residing at Manassas, in the county of Prince William and State of Virginia, have invented certain new and useful Improvements in Trap Attachments for Nests; and I do hereby declare the following to be a full, clear, and exact description of the invention, such as will enable others skilled in the art to which it appertains to make and use the same.

It has become desirable to keep the laying record of hens and fowls generally. To meet this requirement, trap-nests have been devised. These devices are for the most part of special construction and necessitate the purchase of a nest and appurtenances, the latter constituting the trap mechanism.

This invention aims to provide a trap attachment capable of use in connection with any nest whereby the laying record of any hen or fowl can be accurately ascertained, the device being simple, effective, and adapted to be placed in position by the average person without requiring the use of tools.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1 is a rear perspective view of the trap attachment. Fig. 2 is a vertical central longitudinal section thereof, showing it applied to a nest-box, the full and dotted lines showing the two positions of the door.

Corresponding and like parts are referred to in the following description and indicated in the views of the drawings by the same reference characters.

The attachment consists, essentially, of a frame 1 of box-like form open at its front and in the rear. A door 2 is hinged near its top edge to the upper portion or cross-piece of the frame and is free at its lower end to swing rearward and upward. When open, the door folds against the under side of the top portion of the frame and is engaged by means of a trigger 4, loosely connected to the rear portion of the top of the frame. The lower portion of the trigger obstructs the passage through the frame 1, so that a fowl passing therethrough must of necessity come in contact with the trigger and move it to such an extent as to effect a release of the door 2, which when liberated will swing downward and forward and prevent entrance of any other fowl into the nest. The trigger may be of any formation and, as shown, consists of a stout piece of wire of suitable length having one end formed into an eye and loosely stapled to the upper rear portion of the frame 1, the major portion of the wire being bent into the form of a loop or ring which normally projects into the space inclosed by the parts comprising the frame 1, so as to be engaged by the fowl passing through the frame into the nest-box.

The door is held closed by means of a catch 5, applied to the threshold of the frame and positioned to engage with the lower end of the door. This catch preferably consists of a strip of spring metal secured at its rear end to the bottom portion of the frame and extending forwardly and having the front edge portion bent downwardly and thence forwardly, the front extension 6 constituting a finger-grip to be pressed upon when it is required to release the door to admit of the same being opened. A stop 7 is likewise applied to the threshold of the frame 1 and limits the forward movement of the lower end of the door when closing. This stop 7 is preferably constructed of a single length of stout wire bent into the form of a loop, the rear terminal portions of the side members being secured to the threshold and the front end of the loop being bent vertically and constituting the stop proper.

The attachment is designed to be fitted to any nest-box and in practice any suitable means may be resorted to for securing it to the box when properly positioned. It is needless to state that the attachment must be located so as to register with the door-opening of the box. In order to admit of the attachment being readily placed in position and quickly detached, hooks 8 are applied to the sides of the frame near the upper and lower ends and are adapted to coöperate with eye-fastenings 9, applied to the front side of the box 10. The weight of the attachment is sufficient to prevent vertical displacement of the hooks 8, yet when required the attachment can be readily disengaged from the nest-box by lifting the attachment, so as to disengage the hooks 8 from the eyes 9 by sliding a movement.

When positioned and set, the door 2 is opened and engaged by the trigger 4. A fowl passing through the frame will come in contact with the trigger 4 and release the door, which latter will close and prevent exit of the fowl until liberated by the attendant who can keep tally of the number of eggs laid. The hen or other fowl trapped may be released from the nest by means of any door provided for this purpose or may be permitted to pass out through the attachment by opening the door 2 when setting the device for the next hen to enter the box.

The primary purpose of the catch 5 is to hold the door 2 closed after a hen has passed into the nest, thereby preventing a second hen from entering the nest while occupied. By thus excluding the entrance of a second hen when the nest is occupied an accurate record of any particular hen may be preserved. It is to be understood that the same nest may be used for keeping the record of different hens, but only one can occupy the nest at the same time, the door being prevented from opening until released by the person pressing down upon the outer end of the catch 5.

Having thus described the invention, what is claimed as new, and desired to be secured by Letters Patent, is—

A trap attachment for nest-boxes, comprising a box-like frame, fastening means for detachably connecting the frame to a nest-box, a gravity-closing door hinged near its upper end to the top portion of the frame, a trigger for engaging the lower end of the door to hold it open and adapted to be tripped by the fowl passing through the frame to release the door and allow the latter to close by gravity, a spring-metal catch applied to the threshold of the door and consisting of a strip bent downwardly and upwardly to form an engaging portion and a finger-piece, and a loop-shaped stop device having a horizontal portion inclosing the catch and a vertical free end coöperating with the catch to limit the outward movement of the door, substantially as set forth.

In testimony whereof I affix my signature in presence of two witnesses.

JOHN J. WALSH. [L. S.]

Witnesses:
O. P. MERRITT,
W. B. GOODE.